US012075533B2

(12) United States Patent
Beij et al.

(10) Patent No.: US 12,075,533 B2
(45) Date of Patent: Aug. 27, 2024

(54) LIGHT EMITTING DIODE, LED, BASED LIGHTING DEVICE ARRANGED TO EMIT COLORED LIGHT AS WELL AS A CORRESPONDING METHOD FOR OPERATING SUCH A LED BASED LIGHTING DEVICE

(71) Applicant: SIGNIFY HOLDING B.V., Eindhoven (NL)

(72) Inventors: Marcel Beij, Eindhoven (NL); Eugen Jacob De Mol, Eindhoven (NL); Henricus Marius Joseph Maria Kahlman, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 229 days.

(21) Appl. No.: 17/761,476

(22) PCT Filed: Sep. 28, 2020

(86) PCT No.: PCT/EP2020/077106
§ 371 (c)(1),
(2) Date: Mar. 17, 2022

(87) PCT Pub. No.: WO2021/063888
PCT Pub. Date: Apr. 8, 2021

(65) Prior Publication Data
US 2022/0353967 A1 Nov. 3, 2022

(30) Foreign Application Priority Data
Oct. 3, 2019 (EP) .................................... 19201231

(51) Int. Cl.
*H05B 45/10* (2020.01)
*G09G 3/32* (2016.01)
(Continued)

(52) U.S. Cl.
CPC ............... *H05B 45/20* (2020.01); *G09G 3/32* (2013.01); *H05B 45/325* (2020.01); *H05B 45/46* (2020.01)

(58) Field of Classification Search
CPC ........ H05B 45/10; H05B 45/14; H05B 45/18; H05B 45/20; H05B 45/24; H05B 45/28;
(Continued)

(56) References Cited

U.S. PATENT DOCUMENTS

2011/0069094 A1* 3/2011 Knapp ................ G09G 3/3426 345/82
2013/0063035 A1 3/2013 Baddela et al.
(Continued)

FOREIGN PATENT DOCUMENTS

EP 2017890 A2 1/2009
WO 2012145766 A2 10/2012

*Primary Examiner* — Long Nguyen

(57) ABSTRACT

A Light Emitting Diode, LED, based lighting device arranged to emit colored light, wherein said LED based lighting device comprises a first LED channel comprising at least one LED arranged for emitting light at a first color, a second LED channel comprising at least one LED arranged for emitting light at a second color, said second color being different to said first color, a controller arranged for activating said first LED channel and said second LED channel based on a color ratio such that said LED based lighting device emits light having a particular color, wherein said controller is further arranged for correcting said color ratio based on aging of said at least one LED in said first LED channel and on said at least one LED in said second LED channel, thereby ensuring color consistency of said particular color of said LED based lighting device over time.

10 Claims, 4 Drawing Sheets

(51) Int. Cl.
*H05B 45/20* (2020.01)
*H05B 45/325* (2020.01)
*H05B 45/46* (2020.01)

(58) Field of Classification Search
CPC ...... H05B 45/30; H05B 45/32; H05B 45/325; H05B 45/40; H05B 45/44; H05B 45/46; H05B 45/52; G09G 3/30; G09G 3/32
See application file for complete search history.

(56) References Cited

U.S. PATENT DOCUMENTS

2013/0293147 A1 11/2013 Rogers et al.
2019/0110343 A1 * 4/2019 Van Kaathoven .......................... H05B 45/3725

* cited by examiner

LIGHT EMITTING DIODE, LED, BASED LIGHTING DEVICE ARRANGED TO EMIT COLORED LIGHT AS WELL AS A CORRESPONDING METHOD FOR OPERATING SUCH A LED BASED LIGHTING DEVICE

CROSS-REFERENCE TO PRIOR APPLICATIONS

This application is the U.S. National Phase application under 35 U.S.C. § 371 of International Application No. PCT/EP2020/077106, filed on Sep. 28, 2020, which claims the benefit of European Patent Application No. 19201231.8, filed on Oct. 3, 2019. These applications are hereby incorporated by reference herein.

FIELD OF THE INVENTION

The present disclosure relates to a Light Emitting Diode, LED, based lighting device for emitting a particular colored light, wherein said LED based lighting device comprises at least two LED channels, wherein each LED channel is arranged to emit a particular colored light.

BACKGROUND OF THE INVENTION

Lighting devices have been developed that make use of Light Emitting Diodes, LEDs, for a variety of lighting applications. Owing to their long lifetime and high energy efficiency, LED lamps are nowadays also designed for replacing traditional fluorescent lamps, i.e. for retrofit applications. For such an application, a retrofit LED lamp is typically adapted to fit into the socket of the respective lamp fixture to be retrofitted. Moreover, since the maintenance of a lamp is typically conducted by a user, the retrofit LED lamp should ideally be readily operational with any type of suitable fixture without the need for re-wiring the fixture.

The present disclosure is related to multi-channel LED based lighting devices. Each channel may comprise one or a plurality of LED's that are capable of emitting light at a particular color. For example a first channel may be directed to emit red colored light. A second channel may be directed to emit green colored light and a third channel may be directed to emit blue colored light.

More specifically, the present disclosure may especially be applicable for LED based lighting devices having two LED channels, wherein a first LED channel is directed to emit warm white light and a second LEC channel is directed to emit cool white light.

Often, such a LED based lighting device is provided with a current source, wherein the Led based lighting device comprises a current splitter for splitting the current over the different channels.

More specifically, typically, there is a controller available having a plurality of LED channels, wherein each channel is arranged with a switch, wherein each of the switches is thus arranged to enable a particular corresponding channel. For example, a first switch may enable a red channel, a second switch may enable a green channel, a third switch may enable a blue channel, etc.

The switches may be provided width Pulse Width Modulation, PWM, signals having particular duty cycles. The frequency of the PWM signals should be chosen such that it exceeds the refresh rates of the human eye. This would prevent a user from seeing any flickering. By controlling the duty cycle, the contribution of each of the channels to the total amount of light emitted can be controlled, and thus also the color of the light that is emitted by the LED based lighting device.

SUMMARY

It is an object of the present disclosure to provide for a LED based lighting device which is arranged to emit a particular color light and which is arranged to ensure color consistency of said particular color light over time.

In a first aspect, there is provided a Light Emitting Diode, LED, based lighting device arranged to emit colored light, wherein said LED based lighting device comprises:

- a first LED channel comprising at least one LED arranged for emitting light at a first color;
- a second LED channel comprising at least one LED arranged for emitting light at a second color, said second color being different to said first color;
- a controller arranged for activating said first LED channel and said second LED channel based on a color ratio such that said LED based lighting device emits light having a particular color.

The controller is further arranged for correcting said color ratio based on aging of said at least one LED in said first LED channel and on said at least one LED in said second LED channel, thereby ensuring color consistency of said particular color of said LED based lighting device over time.

It was the insight of the inventors that different types of LED's may deteriorate differently over time. For example, warm white colored LED's may deteriorate more quickly over time compared to cool white colored LED's, or vice versa. The above may not only affect the intensity of the light that is emitted by the LED based lighting device but also the color of the LED based lighting device. The present disclosure is directed to the latter.

This may be explained as follow. Typically, the controller may use a certain setpoint for a particular color light. Such a setpoint determines the ratio between the different LED channels. For example, the first LED channel may be active 60% of the time, and the second LED channel may be active 75% of the time. The combination of both LED channels result in a particular light being emitted. The inventors have found that the LED's in the first channel may deteriorate over time differently compared to the LED's in the second channel. As such, also the ratio, i.e. 60% versus 75%, is to be corrected based on that particular deterioration effects.

In accordance with the present disclosure, the above is summarized as being the aging of the LED's. Aging of the LED's may thus result in less light being emitted, or even a shift of color of the light being emitted. Both of which may be taken into account when correcting for the ratio.

Following the above, the color consistency of the LED based lighting device is thus improved by correcting the color ratio based on the aging of the LED's.

In an example, the controller comprises:

- a first color measure for indicating a deterioration of said at least one LED in said first LED channel over time;
- a second color measure for indicating a deterioration of said at least one LED in said second channel over time,
- wherein said controller is arranged for correcting said color ratio based on said first color measure and said second color measure.

The above described example covers, for example, a method in which the controller corrects the color ratio based on the first color measure and the second color measure, wherein these measures indicate the deterioration of the corresponding at least one LED over time. The time does not necessarily be related to the time in which the LED's are actually emitting light, i.e. the operating time or burning time of the LED's.

A rough estimation of the deterioration of the LED's may be based on the time that has lapsed, irrespective of the amount of burning hours of the LED's in that particular lapsed time.

In another example, the first color measure and second color measure indicate a deterioration of said corresponding at least one LED in said corresponding LED channel over time, wherein said time represents time during which said corresponding LED channel is activated, wherein said controller is arranged for:

keeping track of amounts of time that said first LED channel and said second LED channel are activated, and correcting said color ratio based on said first color measure, said second color measure, said tracked amount of time that said first LED channel has been activated and said tracked amount of time that said second LED channel has been activated.

The above described example is directed to the concept that the actual burning hours, i.e. operating hours, of the LED's are tracked to make a more accurate estimation of the deterioration of the LED's. It was found that the deterioration of the LED's is mainly caused by the amount of operating hours of the LED's itself.

In such a situation, the controller may thus keep track of the amount of time that each of the LED channels are activated to obtain a measure for the operating time of each of the LED channels. The color ratio may then be corrected based on the operating time of each of the LED channels.

In another example, said first LED channel comprising said at least one LED is arranged for emitting light having a color temperature of between 2000K-3000K;

said second LED channel comprising said at least one LED is arranged for emitting light having a color temperature of between 6000K-7000K.

The example described above is directed to an LED based lighting device which is arranged to emit white colored light. It is noted that the color temperature, expressed on the Kelvin Scale, K, is the color appearance of the light produced by the LED based lighting device.

It is to be appreciated that, for example, the first LED channel is arranged to emit light having a color temperature of ~2500K and the second LED channel may be arranged to emit light having a color temperature of ~6500K. By having a color ratio in place for the first LED channel and the second LED channel, any composite colored light might be obtained between ~2500K and ~6500K. If the ratio indicates that the first LED channel is dominant over the second LED channel, the temperature of the composite colored light might shift towards the ~2500K. If the ratio indicates that the second LED channel is dominant over the first LED channel, the temperature of the composite colored light might shift towards ~6500K.

In a further example, each of said LED channels comprises a switch for activating said corresponding LED channel, and wherein said controller is arranged for controlling each of said switches in said LED channels based on said color ratio.

The switch may, for example, be a transistor, a Field Effect Transistor, FET, a relay or anything alike.

In yet another example, the controller is arranged for controlling each of said switches using a Pulse Width Modulation, PWM, signal.

In a second aspect, there is provided a method of operating an LED based lighting device in accordance with any of the previous claims, wherein said method comprises the steps of:

activating, by said controller, said first LED channel and said second LED channel based on said color ratio such that said LED based lighting device emits light having a particular color;

correcting, by said controller, said color ratio based on aging of said at least one LED in said first LED channel and on said at least one LED in said second LED channel, thereby ensuring color consistency of said LED based lighting device over time.

It is noted that the advantages and definitions as disclosed with respect to the embodiments of the first aspect of the invention also correspond to the embodiments of the second aspect of the invention, being the method of operating a retrofit Light Emitting Diode, LED, based lighting device.

In an example, the controller comprises a first color measure for indicating a deterioration of said at least one LED in said first LED channel over time and a second color measure for indicating a deterioration of said at least one LED in said second channel over time, wherein said step of correcting comprises:

correcting, by said controller, said color ratio based on said first color measure and said second color measure.

In a further example, the first color measure and second color measure indicate a deterioration of said corresponding at least one LED in said corresponding LED channel over time, wherein said time represents time during which said corresponding LED channel is activated, wherein said method further comprises the steps of:

keeping track, by said controller, of amounts of time that said first LED channel and said second LED channel are activated, and correcting, by said controller, said color ratio based on said first color measure, said second color measure, said tracked amount of time that said first LED channel has been activated and said tracked amount of time that said second LED channel has been activated.

In another example:

said first LED channel comprising said at least one LED is arranged for emitting light having a color temperature of between 2000K-3000K;

said second LED channel comprising said at least one LED is arranged for emitting light having a color temperature of between 6000K-7000K.

In a further example, each of said LED channels comprises a switch for activating said corresponding LED channel, and wherein said step of correcting comprises:

controlling, by said controller, each of said switches in said LED channels based on said color ratio.

In yet another example, the step of controlling comprises:

controlling, by said controller, each of said switches using a Pulse Width Modulation, PWM, signal.

In a further example, said aging of said at least one LED is based on any of:

deterioration of an amount of lumen of said at least one LED over time, and/or a color shift of said at least one LED over time.

The inventors have found that the LED's may also show a color shift over time. This is, for example, caused by the discoloration of the silver mirror and phosphor degeneration. This may also be caused by degeneration of package materials.

In a third aspect, there is provided a computer program product comprising a computer readable medium having instructions stored there on which, when executed by a controller of a Light Emitting Diode, LED, based lighting device, cause said LED based lighting device to implement a method in accordance with any of the examples as provided above.

These and other aspects of the invention will be apparent from and elucidated with reference to the embodiment(s) described hereinafter.

DETAILED DESCRIPTION

Figure 1:
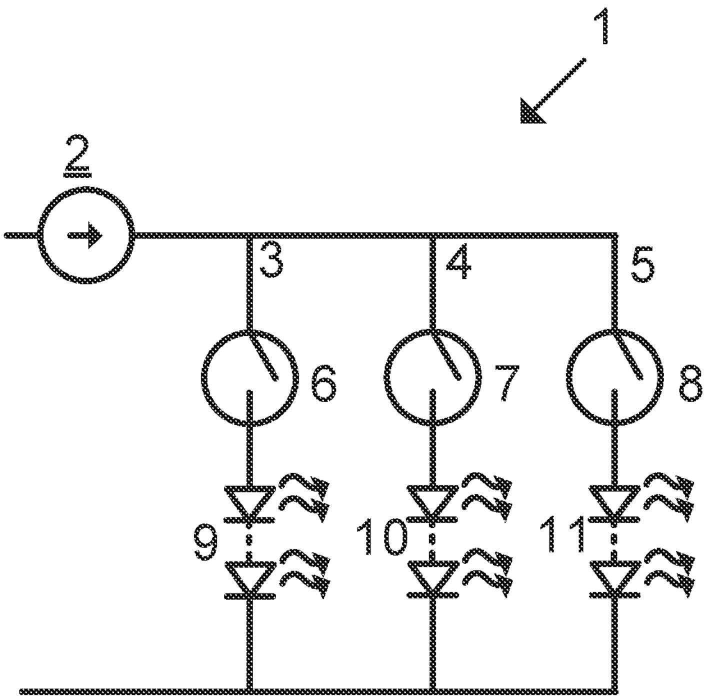
FIG. 1 shows a part of an LED based lighting device in accordance with the present disclosure.

FIG. 1 shows a part 1 of an LED based lighting device in accordance with the present disclosure. More specifically, a current splitter is shown for splitting an LED current between multiple channels.

The LED current splitter may be comprised in a multi-channel Light Emitting Diode, LED, based lighting device. Multi-channel indicates that the LED based lighting device has a plurality of channels, wherein each channel is directed to LED's emitting a particular color. For example, a first channel may be directed to emit red colored light, a second channel may be directed to emit green colored light and a third channel may be directed to emit blue colored light.

In a typical example, a first channel may be directed to emitting Warm White colored light, a second channel may be directed to emitting Cool White colored light, and a third channel may be directed to emitting a further White colored light.

The LED current splitter of FIG. 1 has three channels as indicated with reference numerals 3, 4 and 5, respectively. Each channel comprises a switch 6, 7, 8 and a respective at least one LED 9, 10, 11. Each of the switches 6, 7, 8 may be controlled with Pulse Width Modulation, PWM, signals by a controller 40. The above allows the controller 40 to emit three different primary colors, for example red, green and blue, and to emit a plurality of secondary colors by mixing the channels with one another using a particular color ratio.

The color ratio may thus define the amount of time that each of the switches is activated with respect to one another. The color ratio may thus mix the colors emitted by each of the channels.

A current source 2 is indicated for providing the LED current to the LED current splitter. It is noted that the current 2 source may be implemented in a variety of ways. For example, the current source 2 may be implemented as an LED driver.

The inventors have noted that the LED's in the first channel 3 may have different aging properties compared to the LED's in the second channel 4 and the LED's in the third channel 5. The LED's in the second channel 4 may also have different aging properties compared to the LED's in the third channel 5.

Aging may, for example, be directed to the amount of Lumens emitted by the respective LED over time. The amount of lumens may decrease over time due to the aging factors.

Another possibility is that a color shift occurs over time. This is also encompassed, in accordance with the present disclosure, by the aging process.

A controller 40 may be provided which is then arranged for correcting said color ratio based on aging of said at least one LED in said first LED channel and on said at least one LED in said second LED channel, thereby ensuring color consistency of said particular color of said LED based lighting device over time.

FIG. 1 shows an example where three LED strings are used. An LED current splitter with two LED strings can also be used. In this example a first channel may be directed to emitting Warm White colored light and a second channel may be directed to emitting Cool White colored light.

For example, in order to emit a particular color light, the switch as indicated with reference numeral 6 may have a 50% duty cycle and the switch as indicated with reference numeral 7 may also have a 50% duty cycle. In other words, the color ratio is 1:1 as each of the switches is activated for the same amount of time. Due to the different properties of the LED's with reference numerals 6 and 7, and having the color consistency in mind, the color ratio may be adapted, over time, to ensure the color consistency. The ratio may, for example, be amended to 1:1.02 or anything alike.

The aging properties of each of the LED's may be stored in the LED based lighting device itself, for example in a memory 42 coupled to the controller 40. The controller 40 may keep track of the amount of burning hours of each of the LED's and may calculate the color ratio in an ongoing process.

Figure 2:
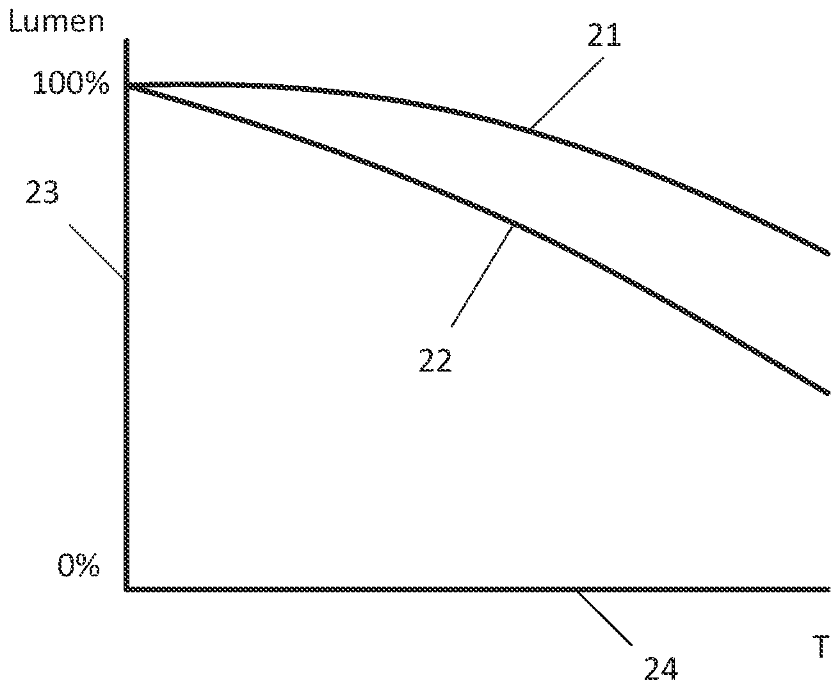
FIG. 2 shows a typical example of LED degradation over time for two different LED's.

FIG. 2 shows a typical example of LED degradation over time for two different LED's.

Here, the vertical axis 23 denoted the amount of Lumen, in percentage, compared to the initial amount of Lumen emitted by the respective LED. The horizontal axis 24 denoted the actual burning hours of the respective LED.

It is shown that a first LED, for example the one as indicated with reference numeral 21, degrades differently over time compared to the second LED, for example the one as indicated with reference numeral 22.

Figure 3:
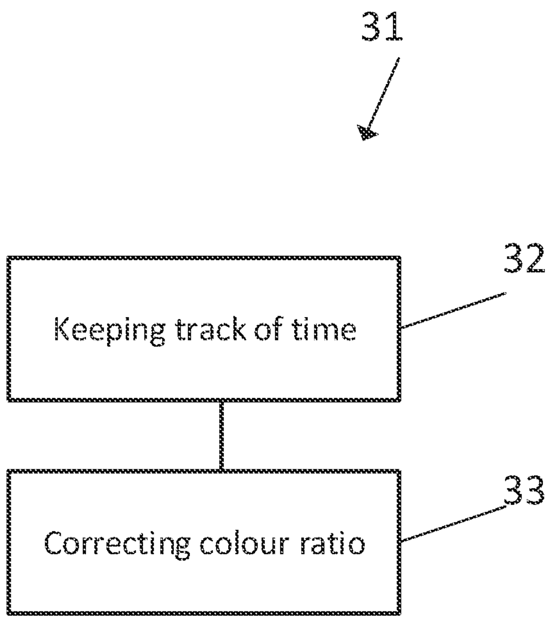
FIG. 3 shows a flow chart of a method in accordance with the present disclosure.
Figure 4:
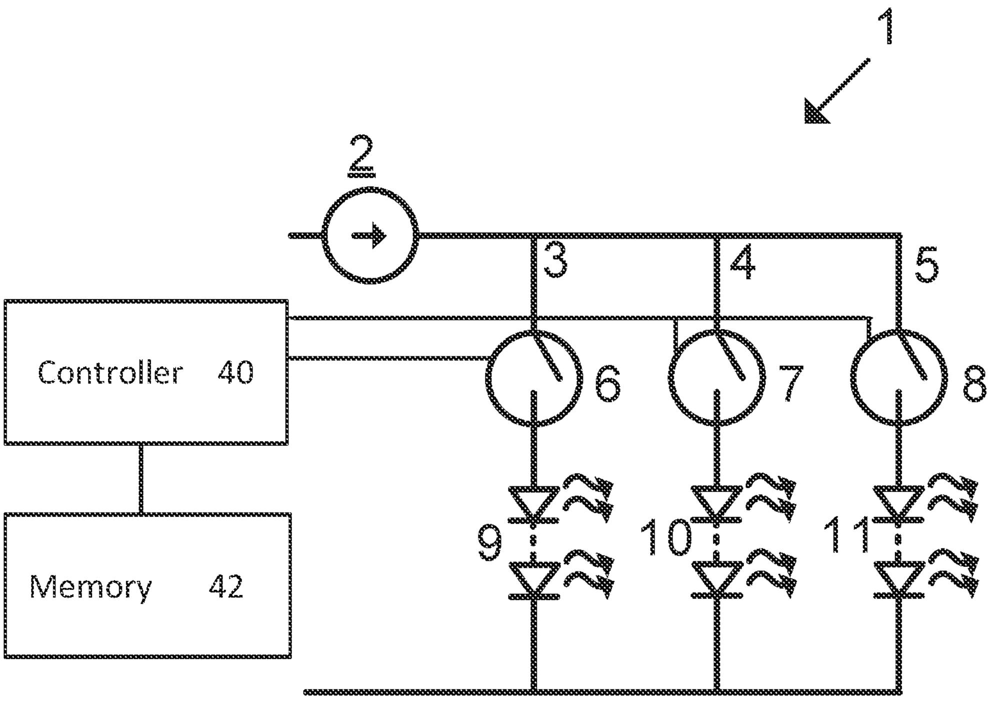
FIG. 4 shows a part of an LED based lighting device in accordance with the present disclosure.

FIG. 3 shows a flow chart 31 of a method in accordance with the present disclosure.

The method 31 is directed to the operating an LED based lighting device in accordance with any of the previous claims, wherein said method comprises the steps of:

- activating 32, by said controller 40, said first LED channel and said second LED channel based on said color ratio such that said LED based lighting device emits light having a particular color;
- correcting 33, by said controller 40, said color ratio based on aging of said at least one LED in said first LED channel and on said at least one LED in said second LED channel, thereby ensuring color consistency of said LED based lighting device over time.

Other variations to the disclosed embodiments can be understood and effected by those skilled in the art in practicing the claimed invention, from a study of the drawings, the disclosure, and the appended claims, In the claims, the word "Comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A Light Emitting Diode (LED) based lighting device arranged to emit colored light, wherein said LED based lighting device comprises:

a first LED channel comprising at least one LED arranged for emitting light at a first color and a switch;

a second LED channel comprising at least one LED arranged for emitting light at a second color, said second color being different to said first color and a further switch;

a memory for storing aging properties of each LED of the first LED channel and the second LED channel; and a controller arranged for:

activating said first LED channel and said second LED channel by controlling the switch and the further switch with a pulse width signal based on a color ratio such that said LED based lighting device emits light having a particular color; and keeping track of amounts of time that said first LED channel and said second LED channel are activated, and correcting said color ratio based on the aging properties of each of the LEDs and said tracked amount of time that said first LED channel has been activated and said tracked amount of time that said second LED channel has been activated, thereby ensuring color consistency of said particular color of said LED based lighting device over time.

2. The LED based lighting device in accordance with claim 1, wherein:

said first LED channel comprising said at least one LED is arranged for emitting light having a color temperature of between 2000K-3000K; and said second LED channel comprising said at least one LED is arranged for emitting light having a color temperature of between 6000K-7000K.

3. The LED based lighting device in accordance with claim 1, wherein said controller is arranged for controlling each of said switches using a Pulse Width Modulation, PWM, signal.

4. The LED based lighting device in accordance with claim 1, wherein said aging of said at least one LED is based on any of:

deterioration of an amount of lumen of said at least one LED over time, and/or a color shift of said at least one LED over time.

5. A method of operating an LED based lighting device, wherein said LED based lighting device comprises: a first LED channel comprising at least one LED arranged for emitting light at a first color and a switch; a second LED channel comprising at least one LED arranged for emitting light at a second color, said second color being different to said first color and a further switch; a memory for storing aging properties of each LED of the first LED channel and the second LED channel; and wherein said method comprises:

activating, by said controller, said first LED channel and said second LED channel based on said color ratio such that said LED based lighting device emits light having a particular color;

storing, in a memory, aging properties of each LED of the first LED channel and the second LED channel;

keeping track of amounts of time that said first LED channel and said second LED channel are activated; and correcting, by said controller, said color ratio based on aging properties of each of the LEDs and said tracked amount of time that said first LED channel has been activated and said tracked amount of time that said second LED channel has been activated, thereby ensuring color consistency of said particular color of said LED based lighting device over time.

6. The method of operating an LED based lighting device in accordance with claim 5, wherein said controller comprises a first color measure for indicating a deterioration of said at least one LED in said first LED channel over time and a second color measure for indicating a deterioration of said at least one LED in said second channel over time, wherein said correcting comprises:

correcting, by said controller, said color ratio based on said first color measure and said second color measure.

7. The method of operating an LED based lighting device in accordance with claim 6, wherein said first color measure and second color measure indicate a deterioration of said corresponding at least one LED in said corresponding LED channel over time, wherein said time represents time during which said corresponding LED channel is activated, wherein said method further comprises:

keeping track, by said controller, of amounts of time that said first LED channel and said second LED channel are activated, and correcting, by said controller, said color ratio based on said first color measure, said second color measure, said tracked amount of time that said first LED channel has been activated and said tracked amount of time that said second LED channel has been activated.

8. The method of operating an LED based lighting device in accordance with claim 5, wherein:

said first LED channel comprising said at least one LED is arranged for emitting light having a color temperature of between 2000K-3000K;

said second LED channel comprising said at least one LED is arranged for emitting light having a color temperature of between 6000K-7000K.

9. The method of operating an LED based lighting device in accordance with claim 7, wherein said controlling comprises:

controlling, by said controller, each of said switches using a Pulse Width Modulation, PWM, signal.

10. A computer program product comprising a non-transitory computer readable medium having instructions stored there on which, when executed by a controller of a Light Emitting Diode, LED, based lighting device, cause said LED based lighting device to carry out a method in accordance with claim 5.

* * * * *